(12) United States Patent
Ahnert et al.

(10) Patent No.: US 8,208,647 B2
(45) Date of Patent: Jun. 26, 2012

(54) METHOD AND DEVICE FOR DETERMINING A ROOM ACOUSTIC IMPULSE RESPONSE IN THE TIME DOMAIN

(75) Inventors: Wolfgang Ahnert, Berlin (DE); Stefan Feistel, Berlin (DE); Alexandru Radu Miron, Berlin (DE)

(73) Assignee: SDA Software Design Ahnert GmbH, Berlin (DE)

( * ) Notice: Subject to any disclaimer, the term of this patent is extended or adjusted under 35 U.S.C. 154(b) by 943 days.

(21) Appl. No.: 12/168,112

(22) Filed: Jul. 5, 2008

(65) Prior Publication Data

US 2009/0010443 A1 Jan. 8, 2009

(30) Foreign Application Priority Data

Jul. 6, 2007 (DE) .......................... 10 2007 031 677

(51) Int. Cl.
*H04R 29/00* (2006.01)
(52) U.S. Cl. ........................................ 381/59
(58) Field of Classification Search ............... 381/59
See application file for complete search history.

(56) References Cited

U.S. PATENT DOCUMENTS

| | | | |
|---|---|---|---|
| 3,718,813 A | 2/1973 | Williams, Jr. et al. | |
| 4,067,060 A | 1/1978 | Poussart et al. | |
| 4,618,987 A * | 10/1986 | Steinke et al. | 381/82 |
| 4,628,530 A * | 12/1986 | Op De Beek et al. | 381/103 |
| 5,896,456 A | 4/1999 | Desper | |
| 6,111,957 A | 8/2000 | Thomasson | |
| 7,688,678 B2 * | 3/2010 | Larsen et al. | 367/99 |
| 2003/0036872 A1 | 2/2003 | Stark | |

FOREIGN PATENT DOCUMENTS

| | | |
|---|---|---|
| DE | 69523306 T2 | 7/2002 |
| DE | 10 2004 047042 A1 | 4/2006 |
| EP | 0764003 B1 | 10/2001 |
| WO | 2004097350 A2 | 11/2004 |
| WO | 2005100977 A2 | 10/2005 |

OTHER PUBLICATIONS

Ajdler, T., Dynamic Measurement of Room Impulse Responses Using a Moving Microphone, Journal Acoustical Society of America, 122 (3), Sep. 2007, pp. 1636-1645.

(Continued)

*Primary Examiner* — Alexander O Williams
(74) *Attorney, Agent, or Firm* — Sutherland Asbill & Brennan LLP

(57) ABSTRACT

Embodiments of the invention can relate to methods and devices for determining a room acoustic impulse response in a time domain. In one embodiment, an acoustic input signal from an acoustic signal source is emitted into an acoustic room, an acoustic output signal is detected by an acoustic measuring device in the room and fed from the acoustic measuring device to an evaluating device and, via the evaluating device, from a reference signal corresponding to the acoustic input signal, and the acoustic output signal, if necessary after prior processing of the acoustic output signal, a room acoustic impulse response in the time domain of the acoustic room is calculated in realtime and prepared for output in that, temporally in parallel and continuously, the acoustic input signal is emitted, the acoustic output signal is detected and, via the evaluating device, the room acoustic impulse response in the time domain is determined.

15 Claims, 13 Drawing Sheets

OTHER PUBLICATIONS

Beranek, L., Concert Hall Acoustics-1992, Journal Acoustical Society of America, 92 (1), Jul. 1992, pp. 1-39.

Doherty, J., A Robust Echo Canceler for Acoustic Environments, IEEE Transactions on Circuits and Systems II, vol. 44, No. 5, May 1997, pp. 389-396.

Gover, B., Measurements of Directional Properties of Reverberant Sound Fields in Rooms Using a Spherical Microphone Array, Journal Acoustical Society of America, 116 (4), Oct. 2004, pp. 2138-2148.

Ahnert et al., 2006, "Software Based Live Sound Measurements," AES, 121st Convention, pp. 1-12, San Francisco.

DRA Laboratories, "MLSSA Acoustical Measurement System," (Online), Sarasota, FL, USA (http://www.mlssa.com/pdf/MLSSA-Brochure.pdf).

Tsakiris et al., 2004, "Optimum Loudspeaker System with Subwoofer and Digital Equalization," AES, 117th Convention, pp. 1-11, San Francisco.

Ahnert te al., 2004, "Merging Room-Acoustic and Electro-Acoustic Measurement Methods," AES, 116th Convention, pp. 1-11, Berlin.

Lynn, Paul A., "Introductory Digital Signal Processing with Computer Applications", John Wiley & Sons, pp. 275-279, Jan. 1, 1994, 8.3.2 Signal Segmentation.

* cited by examiner

METHOD AND DEVICE FOR DETERMINING A ROOM ACOUSTIC IMPULSE RESPONSE IN THE TIME DOMAIN

CROSS-REFERENCE TO RELATED APPLICATION

Applicants hereby claim priority under 35 U.S.C. §119(a) to German Patent Application No. 102007031677.3, filed Jul. 6, 2007, the disclosure of which is expressly incorporated herein by reference in its entirety.

The invention relates to techniques for determining a room acoustic impulse response in the time domain.

BACKGROUND OF THE INVENTION

The determination of an acoustic impulse response is a task that is associated with various applications. These include, on the one hand, non-room acoustic investigations of a test system, for example, the characterising of loudspeakers or other acoustic signal sources and, on the other hand, the room acoustic investigation of a test system, in particular the analysis of the acoustics of rooms wherein a room acoustic impulse response or acoustic room impulse response is determined.

Usually, when an acoustic impulse response is determined, an input signal is provided and emitted by an acoustic signal source. In the case of loudspeaker analysis, the input signal is emitted by the loudspeaker. The acoustic signal fed in 'convolves' with the impulse response of the system to be analysed. An acoustic output signal is produced. When rooms are investigated, the acoustic signal can be measured with an acoustic measuring device, for example, a microphone.

The signals that can be evaluated are therefore the acoustic input signal and the acoustic output signal or acoustic signals derived therefrom following optional processing. Using a known mathematical tool, the acoustic signals can be subjected to a Fourier transformation in the frequency domain, which produces: $A(\omega)=E(\omega)\times H(\omega)$, where $A(\omega)$ is the Fourier transform of the measured acoustic output signal, $E(\omega)$ is the Fourier transform of the acoustic input signal and $H(\omega)$ is the Fourier transform of the as yet unknown impulse response. Rearranging gives: $H(\omega)=A(\omega)\times E(\omega)^{-1}$. From this, using inverse Fourier transformation, the acoustic impulse response $h(t)$ in the time domain can easily be determined.

FIG. 1 shows a schematic representation in order to illustrate a known measuring arrangement for determining an acoustic impulse response. With the aid of a control device 1 comprising a signal generator 1a and an evaluating device 1b, acoustic signals are generated wherein said signals are, for example, noise signals, sweeps (sliding sinusoidal signals), speech signals or music signals passed via a digital-analogue converter 2 (DAC) to an acoustic signal source 3 via which an acoustic input signal 4 is emitted. With the aid of an acoustic measuring device 5 configured as a microphone, an acoustic output signal is detected and transmitted via an analogue-digital converter 6 (ADC) to the evaluating device 1b, which in the illustration of FIG. 1 is integrated with the signal generator 1a.

It is common to the known methods for determining an acoustic impulse response that, in a measuring step, the acoustic output signal is first detected. In a subsequent process, for example in a laboratory, the acoustic impulse response is then calculated, whether in the context of a room acoustic or a non-room acoustic investigation. This process is also known as a static method for determining the impulse response. Furthermore, for non-room acoustic investigations, that is for example, in conjunction with the characterising of loudspeakers, a real-time measurement of brief non-room acoustic impulse responses impulse responses and frequency responses is also known. However, these are only non-room acoustic impulse responses which are limited temporally to a length of no more than one or two seconds.

SUMMARY OF THE INVENTION

It is an object of the invention to provide a method and a device for determining a roomacoustic impulse response in the time domain, with which the application possibilities of such technologies for the acoustic characterising of test systems are extended. It is intended to overcome existing limitations in the application of known methods for determining room acoustic impulse responses.

This aim is achieved according to the invention with a method for determining a room acoustic impulse response in the time domain according to independent claim 1. According to the invention, a computer-readable storage medium with program code stored thereon which is configured, after loading in a computer device, to carry out a method for determining a room acoustic impulse response in the time domain is also provided according to independent claim 15.

The invention incorporates the concept of detecting a room acoustic impulse response in the time domain, which can also be considered to be the determination of a room acoustic impulse response in that an acoustic input signal is emitted from an acoustic signal source into an acoustic room under investigation, an acoustic output signal is detected by an acoustic measuring device in the acoustic room under investigation and is fed from the acoustic measuring device to an evaluating device and, by means of the evaluating device, from a reference signal representing the acoustic input signal and the acoustic output signal, if necessary after prior processing of the acoustic output signal, a room acoustic impulse response in the time domain of the acoustic room under investigation is calculated in real time and is prepared for output, while the acoustic input signal is continuously emitted temporally in parallel, the acoustic output signal is detected and the room acoustic impulse response is determined in the time domain by means of the evaluating device. Therein, a reference signal corresponding to the acoustic input signal can be derived directly from the acoustic input signal, for example in the case of electronic creation of the acoustic input signal or with the aid of a reference signal measuring device. The acoustic room within the meaning of the present invention is any room for which a room acoustic impulse response can be determined for characterising purposes.

It is also made possible, with the aid of the invention, to measure room acoustic impulse responses, that is acoustic room impulse responses for an acoustic room in an efficient manner and therefore to analyse the acoustic properties of the acoustic room under investigation in a user-friendly manner in that the room acoustic impulse response is determined in the time domain in real time and is prepared for output. The prepared output can be used, for example, in order to generate a graphical representation of the calculated room acoustic impulse response on a monitor. As distinct from the known static measuring methods in which an acoustic measurement takes place in discrete sequential steps and, following their completion, determination of the acoustic impulse response takes place, with the method described, an analysis of the acoustic room under investigation can be carried out dynamically. Determination of the room acoustic impulse response in real time implies in this context that during the continuing measurement of the acoustic output signals, calculation of the room acoustic impulse response is carried out for acoustic output signals previously detected during the measurement. For a duration of the acoustic investigation that can be determined by the user, acoustic input signals are continuously emitted temporally in parallel, acoustic output signals are detected and, by means of the evaluating device, the room acoustic impulse response in the time domain is determined. These method steps are repeated and carried out in a continuous, simultaneous manner. By this means, possible changes in the acoustic characteristics or a measure of their stability in the room under investigation can be directly detected.

A preferred development of the invention provides that the room acoustic impulse response of the acoustic room under investigation including a region of the human hearing frequency range, with a length of several seconds, preferably with a length of approximately four seconds to approximately ten seconds is determined. As distinct therefrom, known methods of real-time analysis for acoustic impulse responses are limited to temporal lengths of not more than two seconds. This is also the reason that known real-time methods in the time domain are not usable for actual rooms. The human hearing range includes acoustic signals with a lower frequency of approximately 15 Hz to an upper frequency limit of approximately 20 kHz.

In a suitable embodiment of the invention, it can be provided that the room acoustic impulse response is determined for a room accommodating a plurality of persons, selected from the following group of rooms: stadium, viewing room, concert hall, theatre, auditorium, lecture theatre, exhibition hall, station building, airport building, church, multi-purpose hall, outdoor site, factory hall or the like.

An advantageous embodiment of the invention provides that the determination of the room acoustic impulse response is carried out using multi-thread technology in the evaluating device. The multi-thread technology involves a software-based technique with which various user-defined processes are stipulated as independent tasks and can be carried out in parallel, in particular also simultaneously. The use of multi-thread technology which is provided for supports, in particular, the use of multiprocessor systems.

Preferably a development of the invention provides that, by means of automatic, level-controlled triggering, the calculation of the room acoustic impulse response in the evaluating device is interrupted if the acoustic output signal falls below a user-definable trigger level value for the duration of a user-definable trigger time. In the case of acoustic investigations in larger rooms, for example concert halls or sports stadia, it is often not possible to use optimised acoustic input signals such as sliding sinusoidal signals when these rooms are occupied by an audience. Instead, announcements and trailers that are regularly played are used. The proposed level-controlled triggering is usable in order to compensate for typical pauses in these acoustic input signals and for noise portions arising therefrom. If, due to the pauses which occur, the signal level of the acoustic output signal or of signals derived therefrom falls below the predetermined trigger level value, the following signal portions are filtered out and are not used for the evaluation.

In an advantageous embodiment of the invention, it can be provided that the calculation and the preparation of the room acoustic impulse response in the time domain of the acoustic room under investigation carried out in real time is performed taking account of a plurality of input channels of the evaluating device, via which respective acoustic output signals which are detected by means of a plurality of allocated acoustic measuring devices in the acoustic room under investigation are fed in. For example, up to six and preferably up to eight and more preferably up to ten input channels are incorporated in the mathematical deconvolution process when determining the room acoustic impulse response. By this means, a plurality of acoustic measuring devices can be evaluated in real time at different locations in the acoustic room under investigation. For example, the acoustic measuring devices can be arranged in the region of different seats in a stadium.

In one development of the invention it can be provided that the respective acoustic output signals on a plurality of input channels of the evaluating device are taken into account in that acoustic room impulse responses calculated therefrom are averaged. By means of the averaging of the signals on a plurality of input channels, the influence of interfering signal portions and noise can be minimised and a representative frequency response of the room can be determined.

A preferred development of the invention provides that a portion which disadvantageously influences the determination of the room acoustic impulse response is filtered out of an original room acoustic impulse response that was determined from the acoustic output signals, in that by means of a detection time window, a desired portion of the original room acoustic impulse response is selected in the evaluation device for the calculation of the room acoustic impulse response. Interfering and therefore disadvantageous portions of the original impulse response are, for example, late reflections, noise or interference of other types. This embodiment enables, in particular, the determination of a frequency response which corresponds to a subjectively perceived tonal balance and also correlates in its temporal length to components of the room acoustic impulse response that are essential components for directional localization.

In a suitable embodiment of the invention, it can be provided that the detection time window is variably set with regard to a temporal length.

An advantageous embodiment of the invention provides that the temporal length of the detection time window is set depending on a frequency of the original room acoustic impulse response. In one embodiment, the temporal length is set inversely proportional to the frequency. At the same time, all the frequencies can be evaluated. The temporal length can be different for all the evaluated frequencies.

Preferably, a development of the invention provides that the detection time window is set, with regard to a relative temporal position, for reception of the original room acoustic impulse response.

In an advantageous embodiment of the invention, it can be provided that the relative temporal position for receiving the acoustic output signal is set in order to detect portions of the original room acoustic impulse response that arrive temporally at the beginning and to filter out portions of the original room acoustic impulse response which arrive temporally later. From the temporal viewpoint, the user stipulates, depending on the local conditions, for example, the room size, the reflection sequence, transmission purpose, speech/music and the subjective impression, which portions of the original room acoustic impulse response are to be included. Preferably, a separation time of approximately 50 ms to approximately 80 ms is used.

In another development of the invention, it can be provided that the acoustic input signal including at least one acoustic signal type selected from the following group of acoustic signal types is emitted: noise, sweep signal, multitone signal, speech signal and music signal.

The method according to one of the configurations and/or the device described can be used to determine acoustic parameters of an acoustic room under investigation, wherein the acoustic parameters are derived from the acoustic room impulse response and at least one measurement variable selected from the following group of measurement variables according to the European norm EN ISO 3382:2000 (the version dated March 2000, annex A): intensity level, EDT ('Early Decay Time'), reverberation time, and the balance between early and late arriving energy. To that extent, what is concerned is a method for determining acoustic parameters of an acoustic room under investigation, wherein the room acoustic impulse response in the time domain which is detected in real time, is more extensively evaluated in that the measurement variables defined in the European norm are determined in part or completely. The method described also enables the determination of all the measurement variables given in the European norm, since the acoustic room impulse response detected has an adequate 'information content' for determining the measurement variables during the detection with the methods described. It can also be provided that the acoustic parameters determined by this means are displayed together with the acoustic room impulse response. The above mentioned measurement variables are known as such from the European norm and are also defined there.

Alternatively or in addition, the acoustic parameters are derived from the acoustic room impulse response and at least one measurement variable selected from the following group of measurements of variables according to the international norm IEC 60268-16: speech intelligibility measures like STI, STIPa and RaSTI.

BRIEF DESCRIPTION OF DRAWINGS

The invention will now be described in greater detail using exemplary embodiments and referring to the figures, in which.

DETAILED DESCRIPTION OF INVENTION

Figure 13:
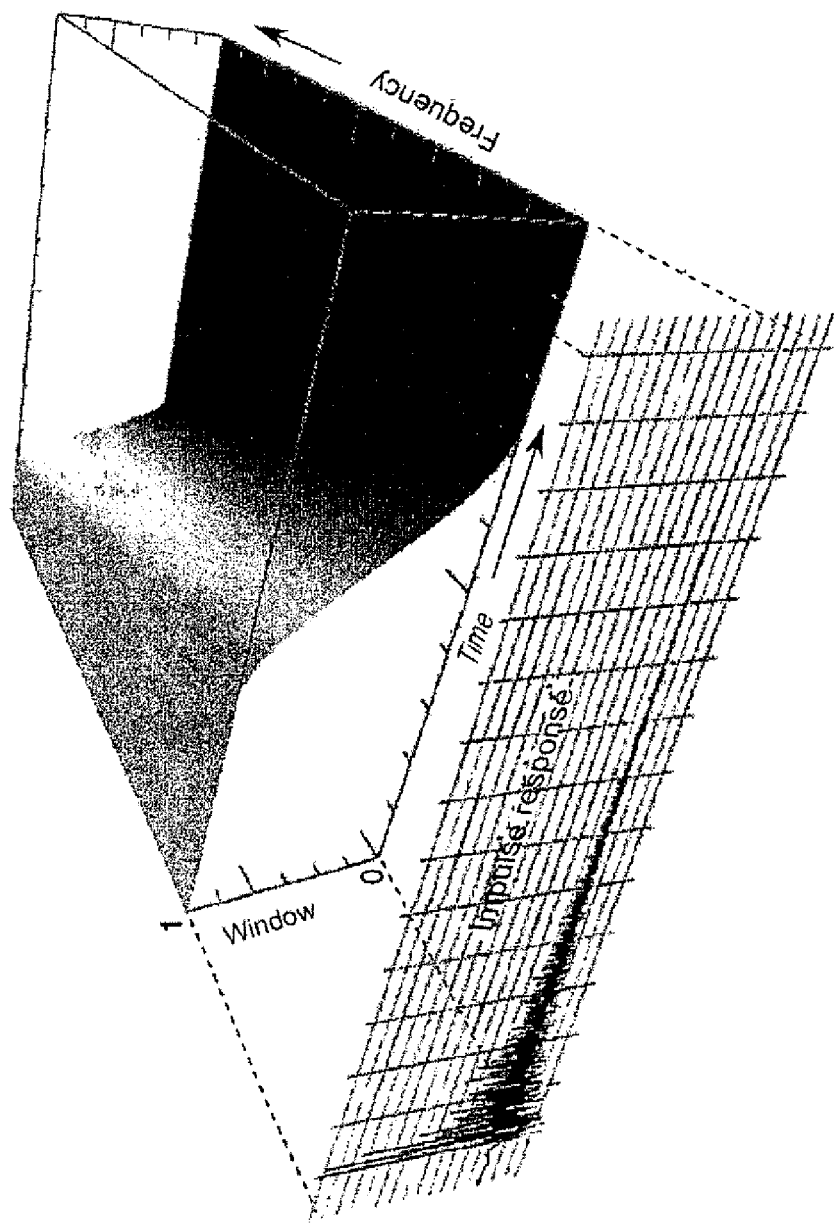
FIG. 13 shows a schematic representation to elucidate the use of a detection time window with which a portion of the acoustic output signal which disadvantageously influences determination of the room acoustic impulse response is filtered out.

Preferred exemplary embodiments of a method and a device for determining a room acoustic impulse response (acoustic room impulse response) in the time domain for an acoustic room under investigation, in real time, will now be described making reference to FIGS. 2 and 13. In the figures, the same reference signs are used for the same features.

Figure 1:
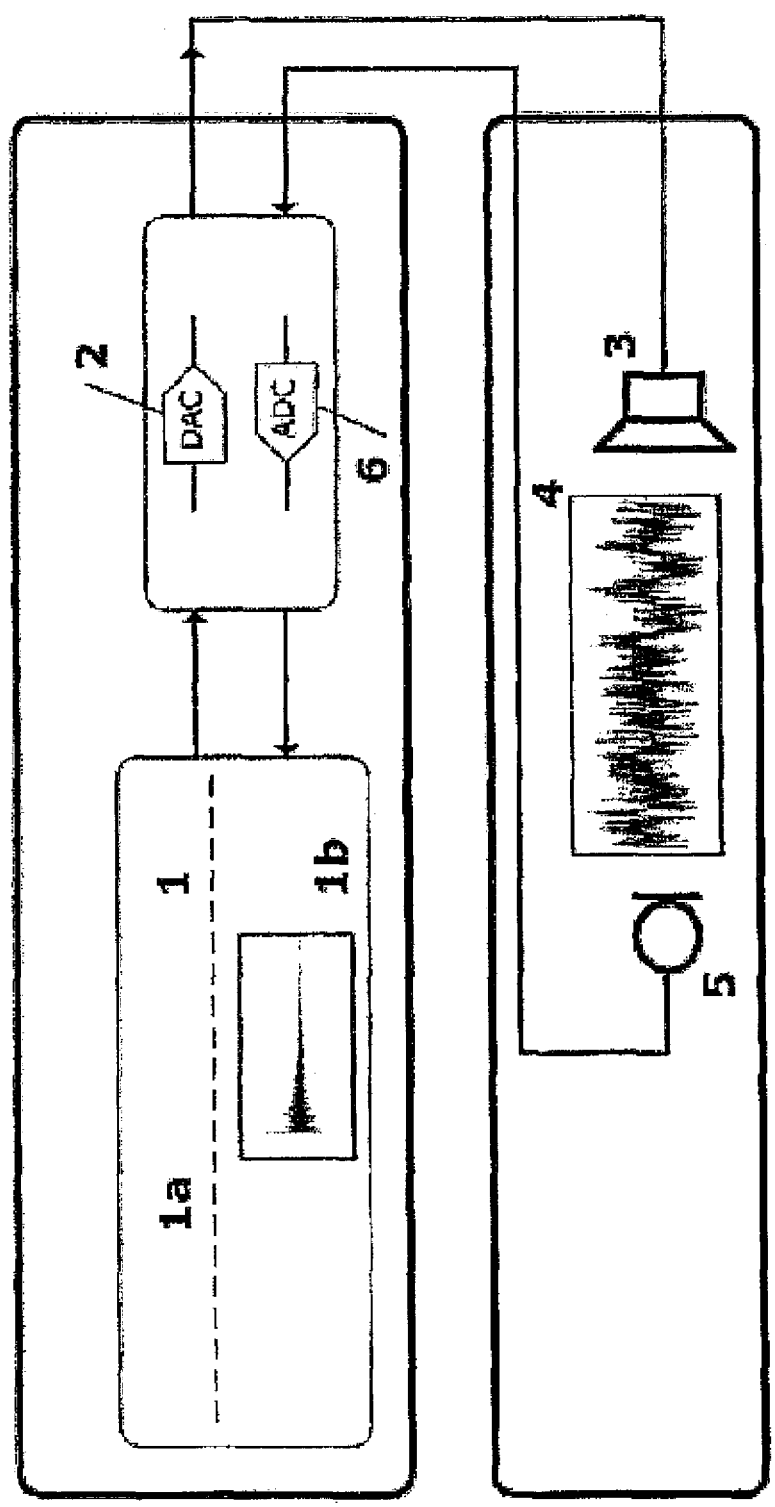
FIG. 1 shows a schematic representation of a known arrangement for determining an acoustic impulse response.
Figure 2:
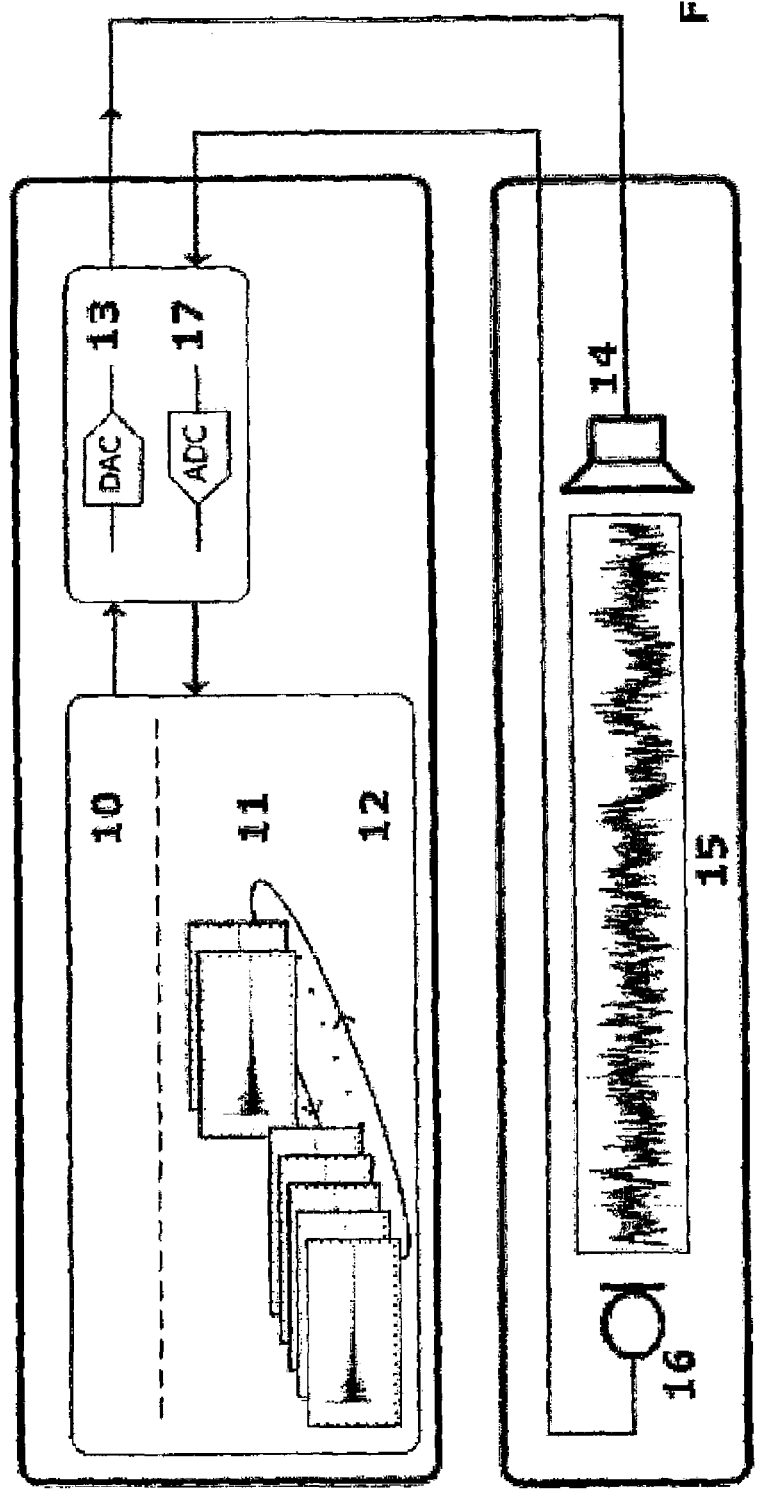
FIG. 2 shows a schematic representation of an arrangement for determining a room acoustic impulse response (acoustic room impulse response) in the time domain, in real time, wherein dynamic signal stimulation with broadband measurement signals is used as the acoustic input signal.

FIG. 2 shows a schematic representation of an arrangement for determining a room acoustic impulse response (acoustic room impulse response) in the time domain, in real time, wherein dynamic signal stimulation with broadband measurement signals is used.

With the aid of a signal generator 10 and a control device 12 comprising an evaluating device 11, acoustic signals are generated wherein the signals are, for example, noise signals, sweeps, speech signals or music signals, which are passed via a digital-to-analogue converter 13 (DAC) to an acoustic signal source 14, via which an acoustic input signal 15 is emitted. With the aid of an acoustic measuring device 16 configured as a microphone, an acoustic output signal is detected and passed via an analogue-to-digital converter 17 (ADC) to the evaluating device 11, which, in the representation in FIG. 2, is integrated together with a signal generator 10. In the exemplary embodiment in FIG. 2, the signal generator 10 and the evaluating device 11 are integrated into the control device 12, although they can be provided as separate devices.

A dynamic acoustic measuring procedure is realised by simple means in that, as the acoustic input signal, a broadband measurement signal, for example, in the form of noise signals or sweeps, is stored in the signal generator 10 which is, for example, a computer. This measurement signal is fed via the DAC 13 and is emitted by means of the acoustic signal source 14 which is suitably configured as a loudspeaker into the acoustic room under investigation. With the aid of the acoustic measuring device 16 arranged in the acoustic room, which in this example is configured as a measuring microphone, the acoustic output signal is detected and fed via the ADC 17 to the evaluating device 11. The evaluating device 11 then determines the room acoustic impulse response for the acoustic room up to impulse lengths of approximately four to approximately ten seconds and makes the calculated result available for further processing, for example for display on a monitor (not shown). As distinct from known statical single measurements, evaluation takes place dynamically in real time, so that even when the acoustic measuring device 16 is being moved, the changes in the room acoustic impulse response or a complex transfer function such as size or signal strength and phase are displayed immediately. Furthermore, acoustic variables such as reverberation time or speech intelligibility are also immediately displayed in relation to site.

Figure 3:
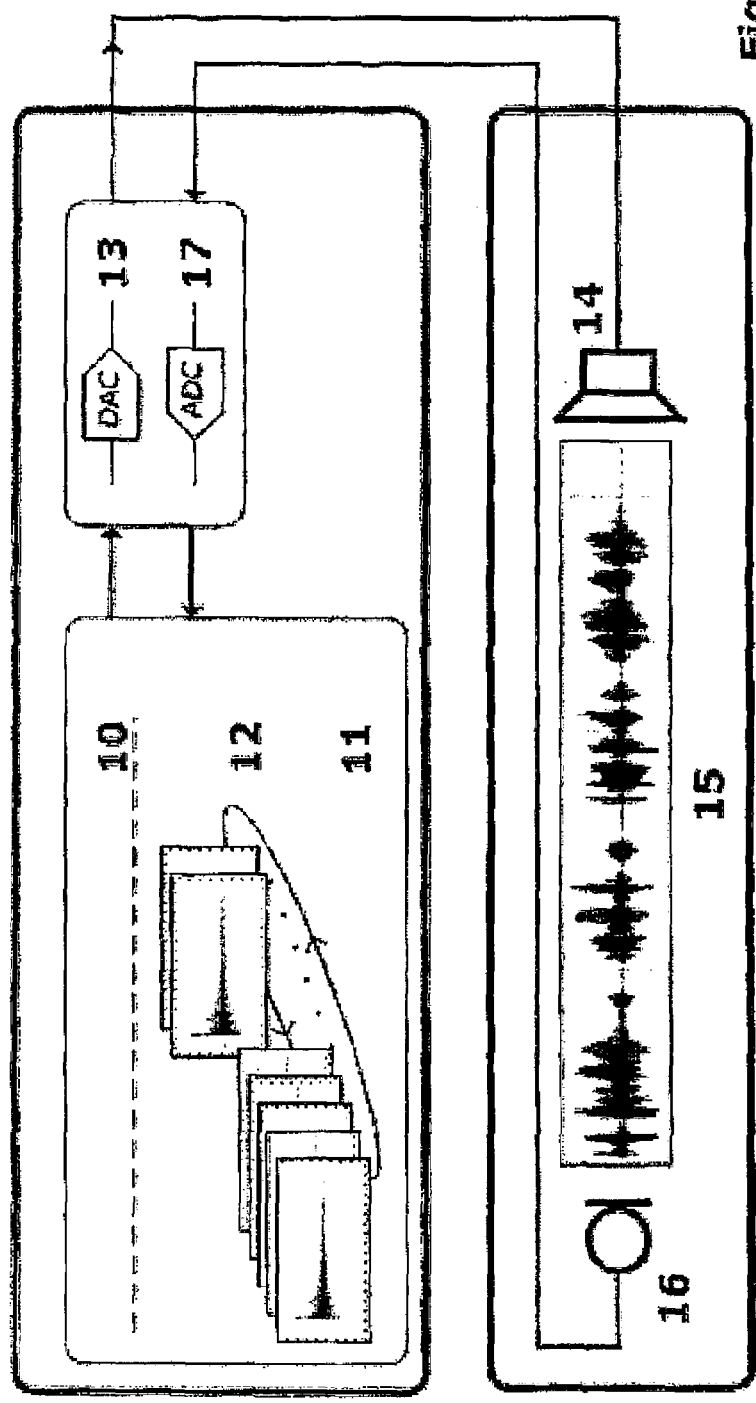
FIG. 3 shows a schematic representation of an arrangement for determining a room acoustic impulse response in the time domain, in real time, wherein dynamic signal stimulation with music signals or speech signals is used as the acoustic input signal.

FIG. 3 shows a schematic representation of an arrangement for determining a room acoustic impulse response in the time domain, in real time, wherein dynamic signal stimulation with music or speech signals is used as the acoustic input signal.

As with conventional single measurements, during the acoustic investigation, the emission of noise signals or sweep signals disturbs, so that the method is also configured for the use of speech or music signals as acoustic input signals. The signals should be sufficiently continuous in time and have a broadband frequency structure. If there are gaps in the time domain or the frequency domain, the automatic trigger system previously described comes into operation in order to enable a qualitatively optimum measuring result. Herein, speech or music signals are emitted from the acoustic signal source 14. The acoustic output signal is then detected by means of the acoustic measuring device 16. With these measurement signals, also, the room impulse response of the test system, that is the room, is measured in real time.

Figure 4:
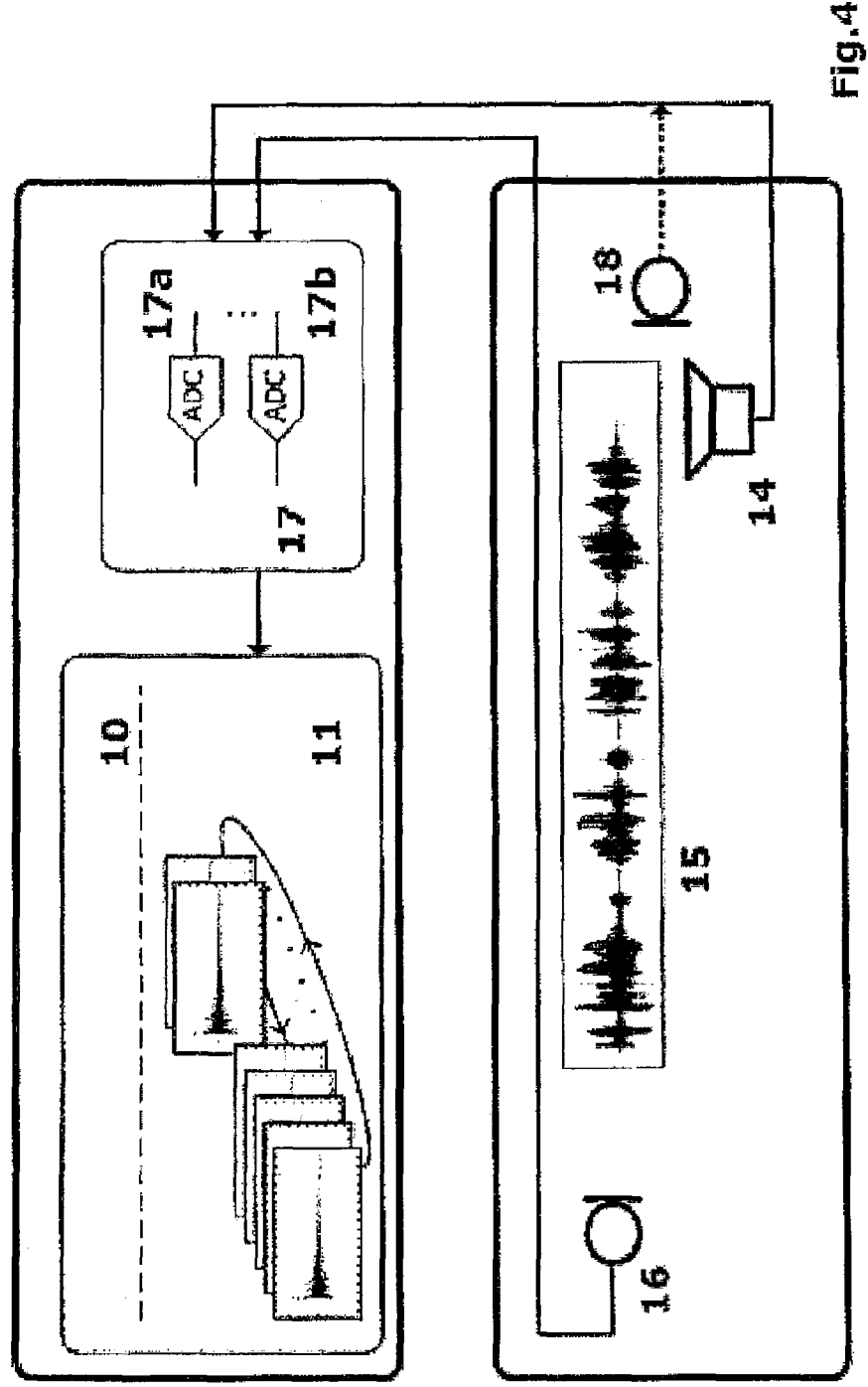
FIG. 4 shows a schematic representation of an arrangement for determining a room acoustic impulse response in the time domain, in real time, wherein external dynamic signal stimulation with music signals or speech signals is used as the acoustic input signal.

FIG. 4 shows a schematic representation of an arrangement for determining a room acoustic impulse response in the time domain, in real time, wherein external dynamic signal excitation with music or speech signals is used.

The emission of self-originated speech or music signals is not always suitable for determining acoustic parameters for occupied interior spaces or stadia. In this case, signals or announcements from the event organiser which correspond to the character of the event, but which cannot be influenced by the measuring system, are fed in. In the embodiment according to FIG. 4, an input 17a of the ADC 17 is fed with the signal from the event organiser, for example, directly from his storage unit or the output of a mixing desk, whilst another channel 17b of the ADC 17 is fed with the acoustic output signal picked up in the hall or stadium. It is also possible to obtain the reference signal via a microphone 18 close to the source, namely close to the acoustic signal source 14.

Here, again, the room acoustic impulse response is already displayed dynamically by means of real-time deconvolution in the evaluating device 11 during the measurement process. Here again, the changes in the acoustic behaviour are made directly visible dynamically if the acoustic measuring device 16 is moved. Averaging during the processing sequence of the measuring system helps to improve a signal-to-noise ratio.

Figure 5:
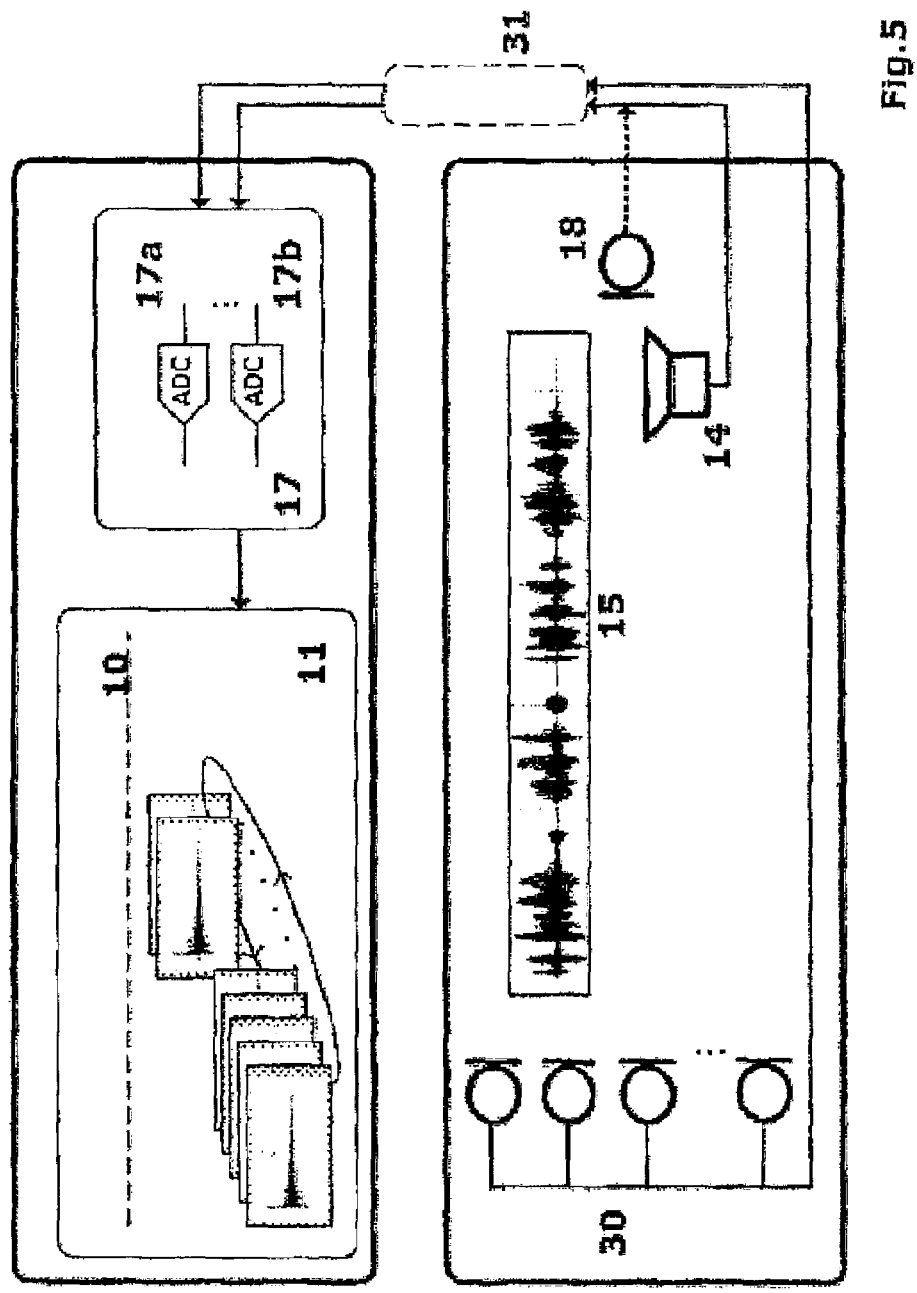
FIG. 5 shows a schematic representation of an arrangement for determining a room acoustic impulse response in the time domain, in real time with a plurality of acoustic measuring devices for detecting acoustic output signals, wherein external dynamic signal stimulation with music signals or speech signals is used as the acoustic input signal.

FIG. 5 shows a schematic representation of an arrangement for determining a room acoustic impulse response in the time domain, in real time, comprising a plurality of acoustic measuring devices 30 for detecting acoustic output signals, wherein external signal stimulation with music or speech signals is used as acoustic input signal.

To increase the effectiveness of the measurements, a plurality of acoustic measuring devices 30 is provided. In order to take account of the occasionally large temporal offset in the various output signals which arrive in the evaluating device 11, it is provided in the exemplary embodiment that the input signals for some of the channels, including a reference signal, are placed in intermediate storage (buffered) in a store 31, in order, following their storage, to evaluate the temporarily stored values at the right time. The reference signal can be an electrical signal again which comes from the reproduction device of the event organiser or a speech microphone on the desk of a speaker or a cumulative microphone signal from an orchestra tape recording made in the direct field of the orchestra.

The method for determining a room acoustic impulse response (acoustic room impulse response) in the time domain for an acoustic room under investigation, in real time, will now be described by reference to FIGS. 6 to 13.

Figure 6:
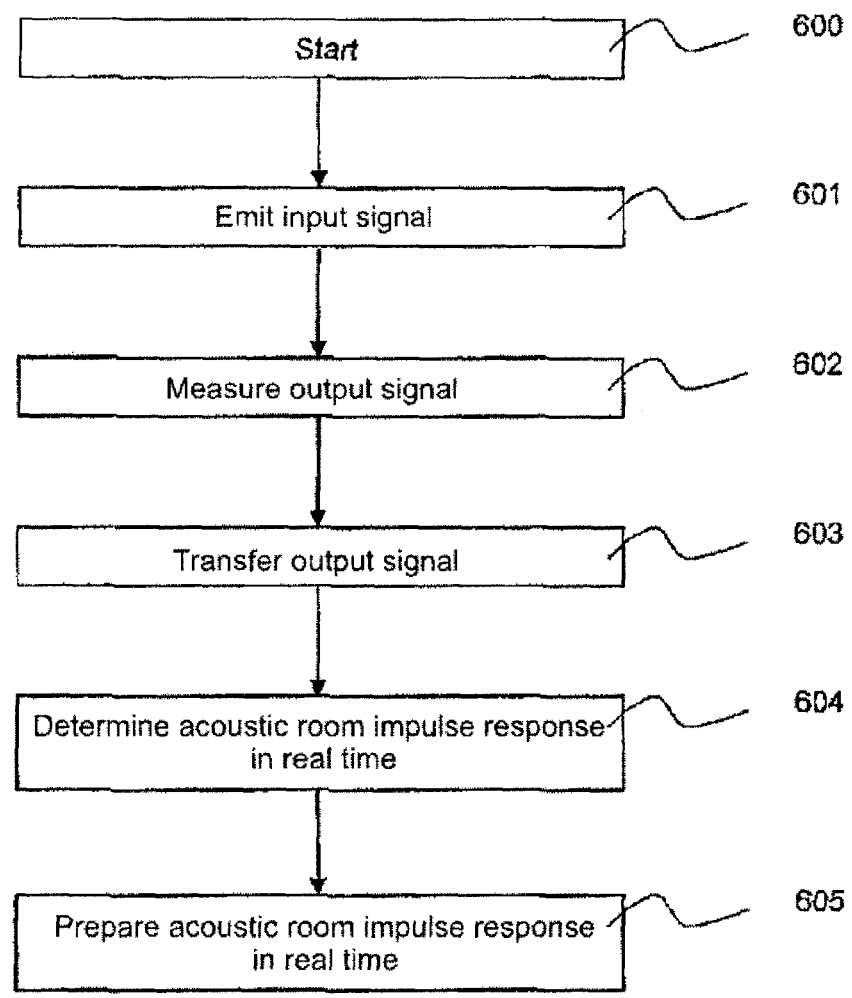
FIG. 6 shows a schematic block diagram of the sequence of a method for determining a room acoustic impulse response in the time domain, in real time.

FIG. 6 shows a schematic block diagram of the sequence of a method for determining a room acoustic impulse response in the time domain, in real time. Following the start 600, an acoustic input signal is emitted in step 601 into the acoustic room under investigation. In the room under investigation, in step 602, an acoustic signal is measured by means of the acoustic measuring device. Following the transfer of the measured acoustic output signals in step 603, the acoustic output signals are evaluated in step 604, making use of a mathematical deconvolution process in the evaluating device in order to determine the room acoustic impulse response in the time domain, in real time. Subsequently, in step 605, the room acoustic impulse response determined is prepared for output in real time, for example, output via a display device. During the continuing emission of acoustic input signals and detection of acoustic output signals, results for the room acoustic impulse response are prepared for the room under investigation.

Some of the techniques used for determining the room acoustic impulse response in the time domain, in real time, according to the exemplary embodiment described above will now be described in greater detail, making reference to FIGS. 7 to 13.

Figure 7:
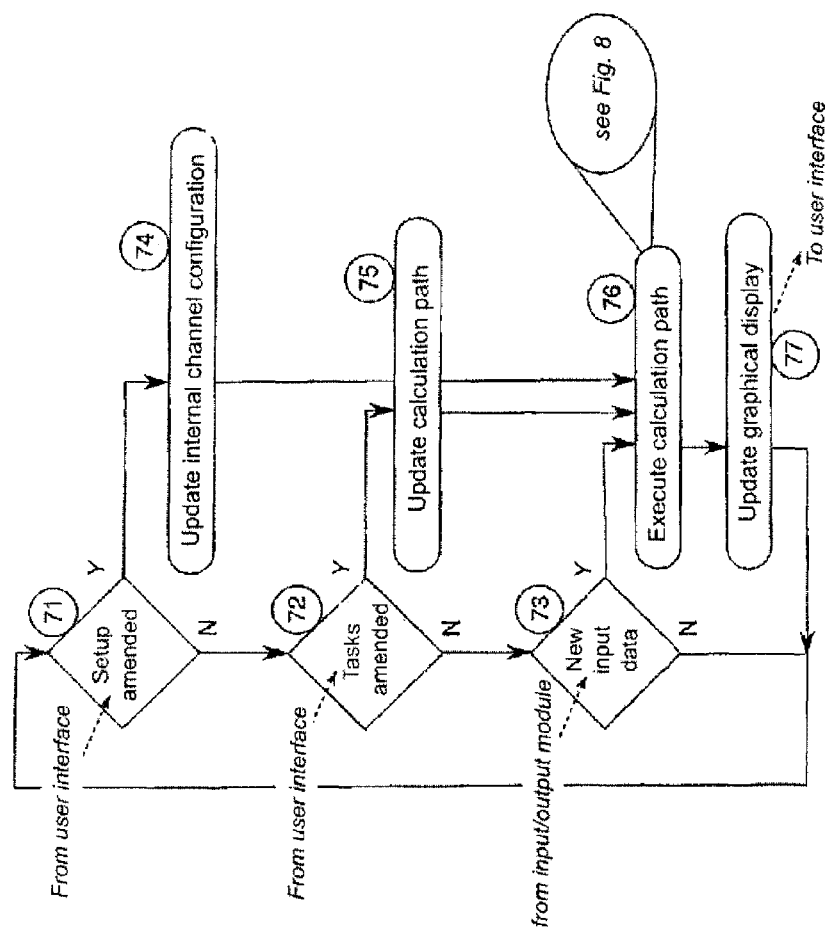
FIG. 7 shows a schematic block diagram to elucidate a calculation model.

FIG. 7 shows a schematic block diagram to elucidate a calculation model.

In real-time operation, an input-output module continuously accepts incoming data for the detected acoustic output signals from the ADC 17 (see FIGS. 2 to 5 above) into a local circular data buffer or transfers data to be output for the acoustic input signals to the DAC 13 for processing in similar manner. The input-output module operates in its own independently defined process, also known as a 'thread', in parallel with the remaining measuring and evaluating program. When new data become available for the acoustic output signals, other processes (threads), which serve, for example, in the calculation or representation of the room acoustic impulse response, are taken into account and this is explained in greater detail below.

FIG. 7 illustrates the function of the calculation module. The calculation module also runs in a thread of its own and can be instanced a plurality of times, so that parallel processing of a plurality of inputs with acoustic output signals can be carried out. Events in the user interface are continuously evaluated and the data are processed by the input-output module.

At the beginning of the process or during operation, the user can specify or amend a channel configuration 71 and/or calculation tasks 72. Thereupon, internal data structures of a calculation thread are updated 74 and a corresponding calculation path is set up 75. Following each change, or whenever new input data are available 73, the current calculation path is executed 76 and a graphical display, for example the room acoustic impulse response, is updated 77.

Figure 8:
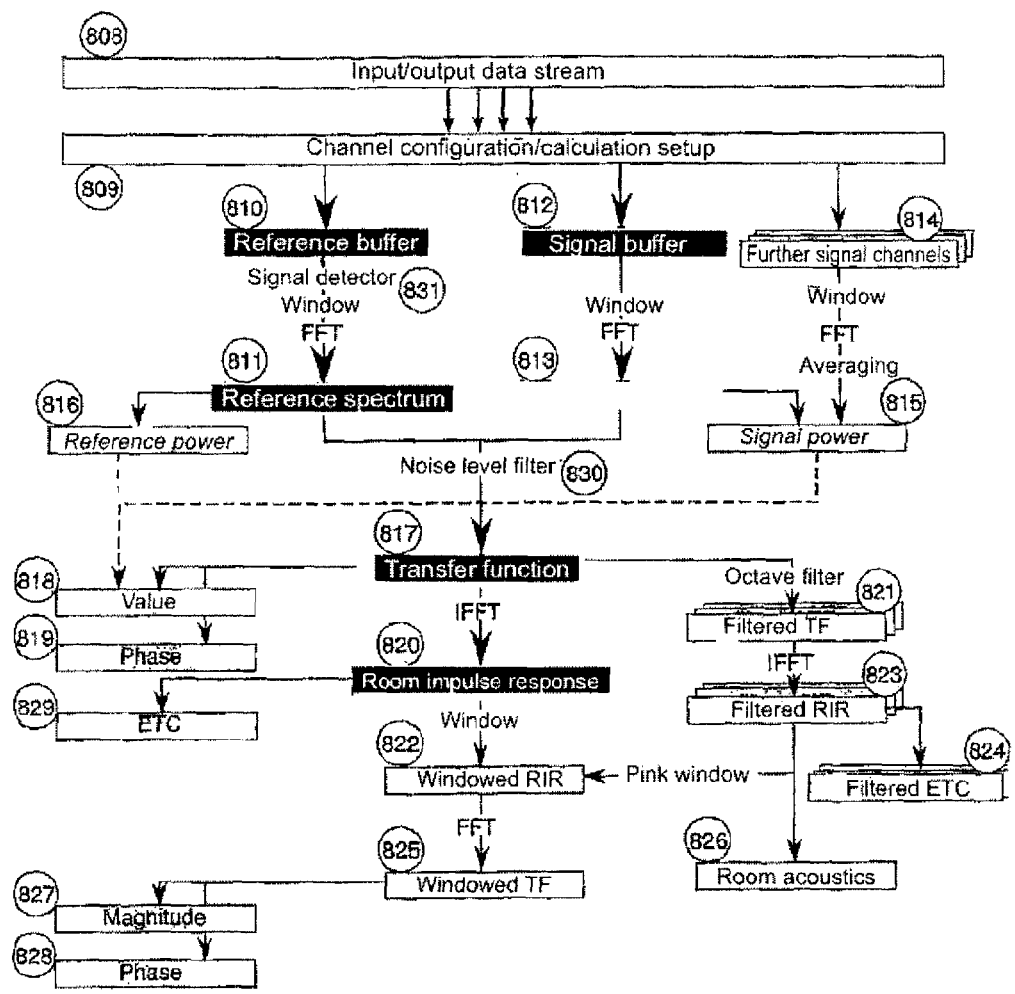
FIG. 8 shows a schematic block diagram to elucidate calculation paths in the method for determining a room acoustic impulse response in the time domain, in real time.
Figure 9:
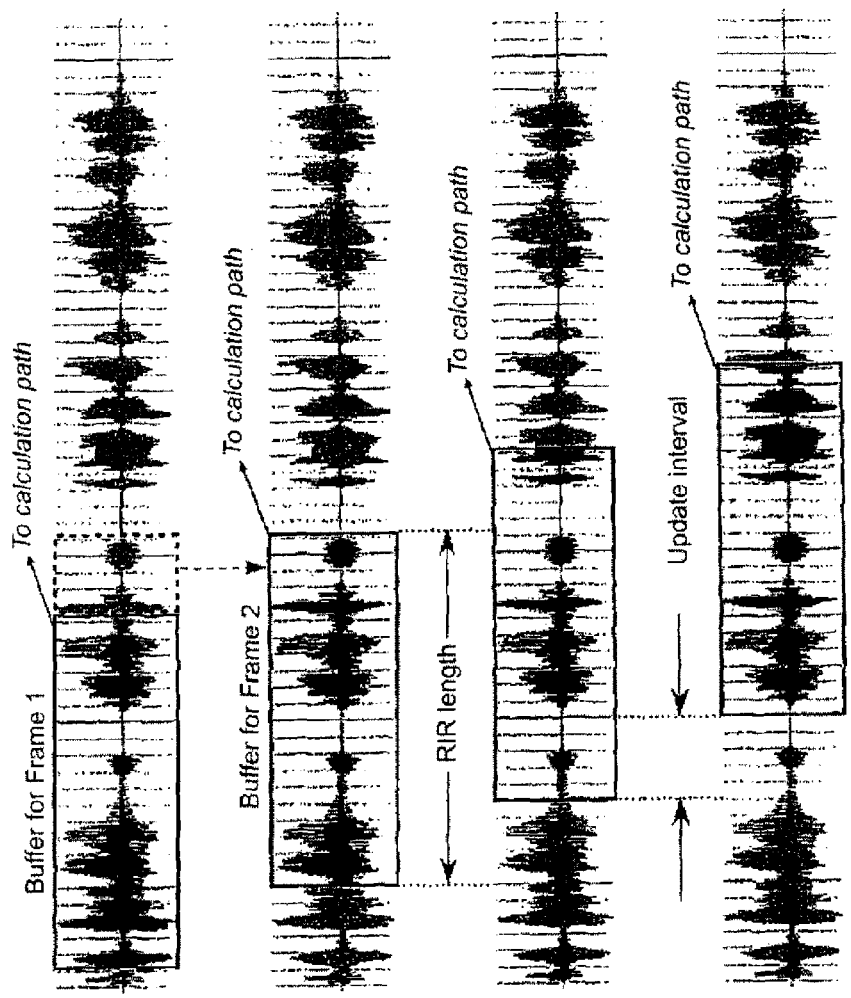
FIG. 9 shows a schematic representation for administration of an incoming data stream in conjunction with an acoustic output signal and update rates associated therewith.

FIG. 8 shows a schematic block diagram to elucidate calculation paths in the method for determining a room acoustic impulse response in the time domain, in real time. Possible results that can be derived from the data stream based on the acoustic output signals are shown. In addition, necessary calculation paths for determining the results are shown schematically.

If a result, for example a room acoustic impulse response is requested by the user (see step 72 in FIG. 7), an associated path 808→809→810→811→812→813→817→820 is activated and the store necessary for this is requested, that is, allocated, by the operating system. The store for unused paths is automatically freed up again by the program.

On each run through the steps in FIG. 7, new data for the acoustic output signals are read in from the input-output module 808 according to a current configuration 809 and internal reference and signal buffers 810, 812 are updated. These are implemented as local data blocks which have, in total, the length of the desired room acoustic impulse response. The length of the updated input data corresponds to the time span between sequential executions of the calculation path. These are usually fractions of a second, which is much shorter than the length of the room acoustic impulse response. A momentary local signal/reference data block with the length of the room acoustic impulse response is designated a 'frame' (see FIG. 9).

Criteria are defined such that a frame contains meaningful measurement data. For example, a mean signal level over a particular time period should exceed a particular limit value. By means of a signal detector function 831 (see also explanations regarding automatic, level-controlled triggering below), all frames that do not fulfil these criteria are rejected and the calculation is abandoned until the next update. Otherwise, the buffers may optionally be windowed and Fourier transformed to reference and signal spectra 811, 813. Suitable power spectra 815, 816 are calculated therefrom. On use of further signal or input channels 814 (see also description regarding use of a plurality of input channels), averaging is carried out across all the signal channels.

A transfer function 817 is calculated as a central variable by means of complex division of the signal spectrum 813 by the reference spectrum 811 in the frequency range. It is herein possible for filters to be included in order, during the measurement, not to admit signal portions which lie outside a frequency range that is to be measured. In addition to the frequency pass filter, noise level filters 830 are also used, wherein the relative contribution of those frequencies which lie below a particular relative level in relation to the maximum level (the Wiener criterion) is strongly reduced. Therein, portions of the acoustic output signals which lie within the permitted frequency range but only contain noise are effectively also excluded. The user is able to input transmission limit values. The filters in question are applied to the transfer function 817.

For the transfer function 817 now obtained, the magnitude 818 is calculated from a multi-channel mean if necessary, taking account of a power spectrum, and the phase 819 is calculated. An inverse Fourier transform of a transfer function 817 leads to a room impulse response 820. Furthermore, by use of octave filters, band-filtered transfer functions 821 are calculated and then also, by means of inverse Fourier transformation, the band-filtered room impulse responses 823. From the band-filtered room impulse response 823 or the broadband room impulse response 820, band-filtered 824 or broadband 829 ETCs (ETC=Energy Time Curve, which corresponds to the squared, logarithmically represented impulse response) can subsequently be calculated. From this, room acoustic parameters 826 are then determined.

A further improvement in the evaluation of the acoustic output signals for determining the room acoustic impulse response consists in defining, for analysis of the portions of the acoustic output signals arriving early (see also the descriptions below regarding the use of a detection time window), a detection time window in the time domain. The detection time window is adjusted such that a direct sound and the first reflections are used for evaluation of the room acoustic impulse response, but not later reflections or noise. This method serves, above all, in the determination of a frequency response which corresponds to the subjectively perceived tonal balance and, in its time length also, to the components of the room acoustic impulse response that are essential for directional localization. For this purpose, the band-filtered room impulse response 823 is calculated or the broadband room impulse response 820 is windowed 822 and, therefrom, an associated windowed transfer function 825 is calculated. Finally, from the windowed transfer function, again the magnitude 827 and the phase 828 can be determined and displayed.

By means of efficient administration of the calculation tasks, the whole procedure for determining the room acoustic impulse response can be carried out in fractions of a second, which enables a high update rate or a low display latency time. With the averaging process switched on, using a plurality of input channels, each result displayed is calculated by averaging across all the frames in a particular time span. Efficient administration is achieved, for example, by means of selection and execution of calculation tasks according to the dependency tree shown in FIG. 8, so that the calculations that do not lie on the path from the input signal to the desired result are not executed or the store required therefor is not allocated. Thus, it is always the minimum necessary store that is allocated, or the minimum number of operations per frame is executed.

Automatic, Level-Controlled Triggering

When measurements are to be made in concert halls or stadia in an occupied state, it is usually not possible to use highly optimised measurement signals such as sliding sinusoidal signals or noise signals. Rather, regularly used announcements and trailers can be used, which are evaluated as they play out in real time, via an electronic input, specifically as a signal directly from the mixing desk, and one or more acoustic inputs, namely room microphones. In order to compensate for the pauses which typically occur between pieces of music and speech announcements and for the relevant noise portions in the result, an automatic trigger system is provided which abandons the calculation of the room acoustic impulse response after a limited time if the input signal is too low. At the same time, the deconvolution itself is adjusted so that missing spectral portions (speech, for example, is strongly band-limited), are removed from the calculation of the room acoustic impulse response. Therefore only those portions of the incoming data stream of the acoustic output signal which actually contain a relevant signal are used for the evaluation.

Figure 10:
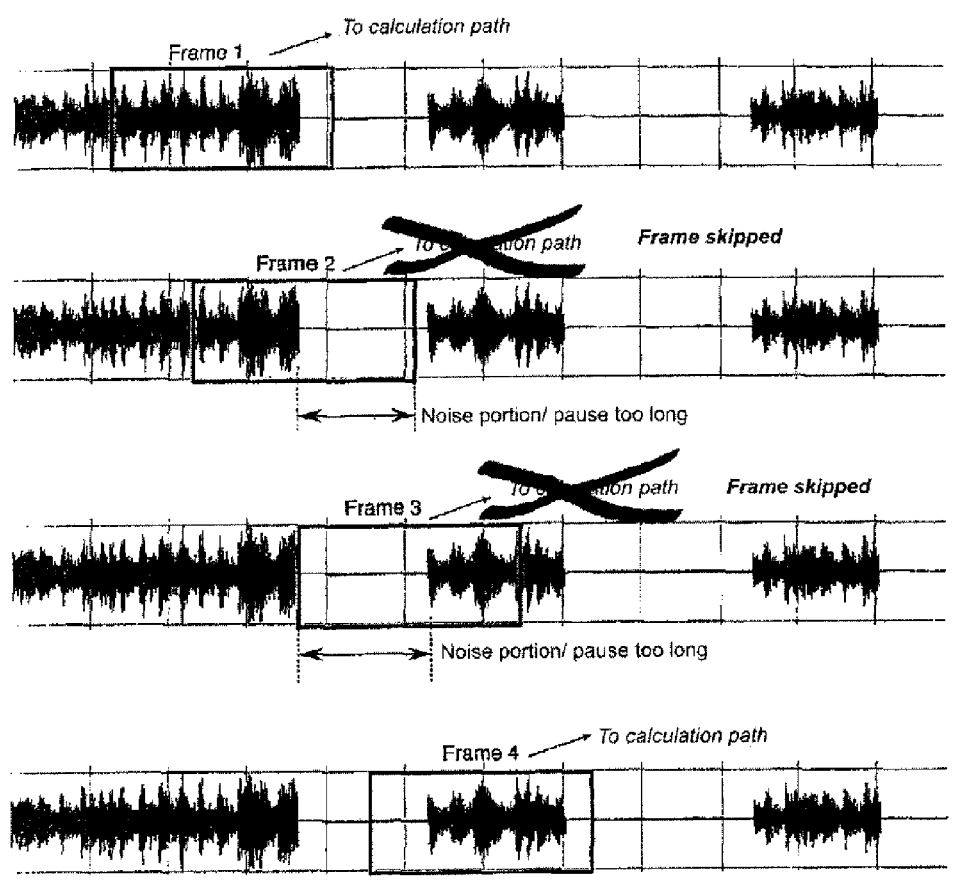
FIG. 10 shows a schematic representation to elucidate an automatic, level-controlled triggering of a calculation of the room acoustic impulse response in an evaluation device, wherein temporary switching off of a calculation path is a condition thereof.

FIG. 10 shows a schematic representation to elucidate an automatic level-controlled trigger system for calculation of the room acoustic impulse response in an evaluating device, wherein a temporary switching off of a calculation path is provided. If the input power of the acoustic output signal over a particular time period defined by the user exceeds a particular threshold value (see FIG. 10, frames 102 and 103), then the further calculation of the room acoustic impulse response is suspended until the point of time at which the noise content of the respective frame is smaller than a user-defined limit value.

Multi-Thread Technology

The utilisation of multi-thread technology enables the use of respectively independent calculation threads or calculation processes for 'stream buffering', the calculation, graphical representations and the user interface. By this means, processes that are to be run according to a standard method or as user-defined can be detached from one another and executed efficiently. Particularly on modern processor systems, the multi-thread technology is supported at a level close to the hardware and therefore allows significant gains in performance. It is precisely through this division that the application is, on the one hand, very rapid and, on the other hand, remains interactive at high load and does not lose any data from the continuously running input and output. The parallelising of calculation and evaluation functions is not a trivial task. The possibilities are always strongly dependent on the structure of the processes to be carried out and require precise adaptation and synchronisation. A plurality of data streams, such as overlays or, in principle, other live channels can also be carried out on multiprocessor systems and displayed in parallel, in that a separate, fully functioning thread is established for each data stream.

Figure 11:
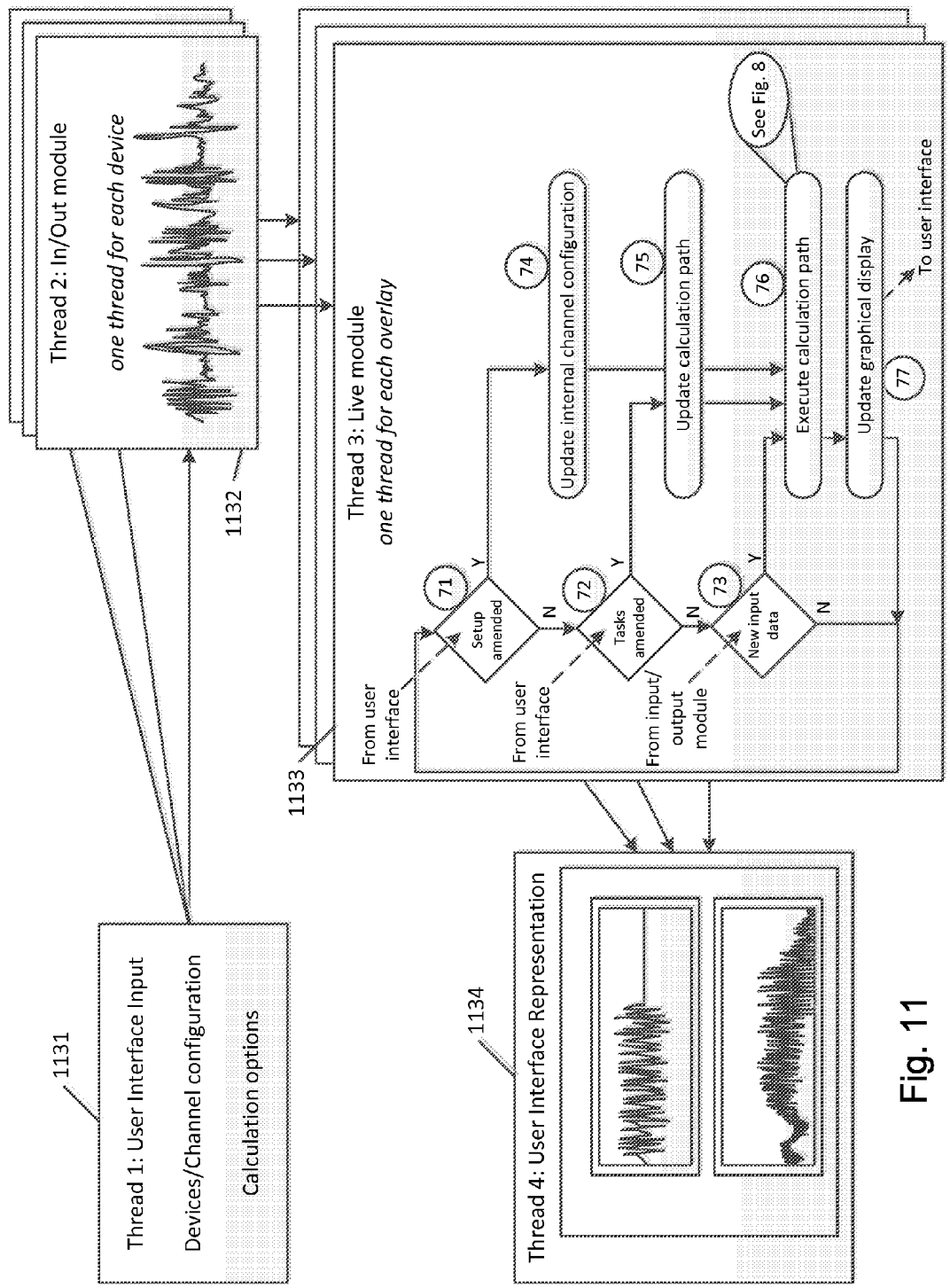
FIG. 11 shows a schematic representation to elucidate the use of multi-thread technology.

FIG. 11 shows a schematic representation to elucidate the use of the multi-thread technology. The interaction with the user takes place in a user interface thread 1131, where a measuring configuration and calculation options are selected by the user. Accordingly, one or more input-output threads 1132 which administer a real-time interaction with input-output devices are started. Calculation modules 1133 are also instanced by the user interface thread 1131. They are informed by the input-output modules when new signals relating to the acoustic output signals are available. Their mode of function was described in greater detail in relation to FIG. 7. When the calculation results are available for a current frame, they are displayed in a display thread 1134.

Use of a Plurality of Input Channels

One embodiment of the method provides for use of a plurality of input channels of the evaluating device simultaneously (see also FIG. 5 and the associated description above), for example eight input channels. As a result, therefore, eight complex frequency responses can be averaged. By this means, in contrast to known "one site" measurements, a plurality of sites, for example in various listening zones in a stadium, can be evaluated and so a representative (global) frequency response can be obtained. In practice, this is of great significance since an equaliser always acts upon a sound irradiator system as a whole and therefore also can only be used globally. In addition, in the case of spatially non-correlated noise, the signal-to-noise ratio can be increased by up to 9 dB (eight channels).

Figure 12:
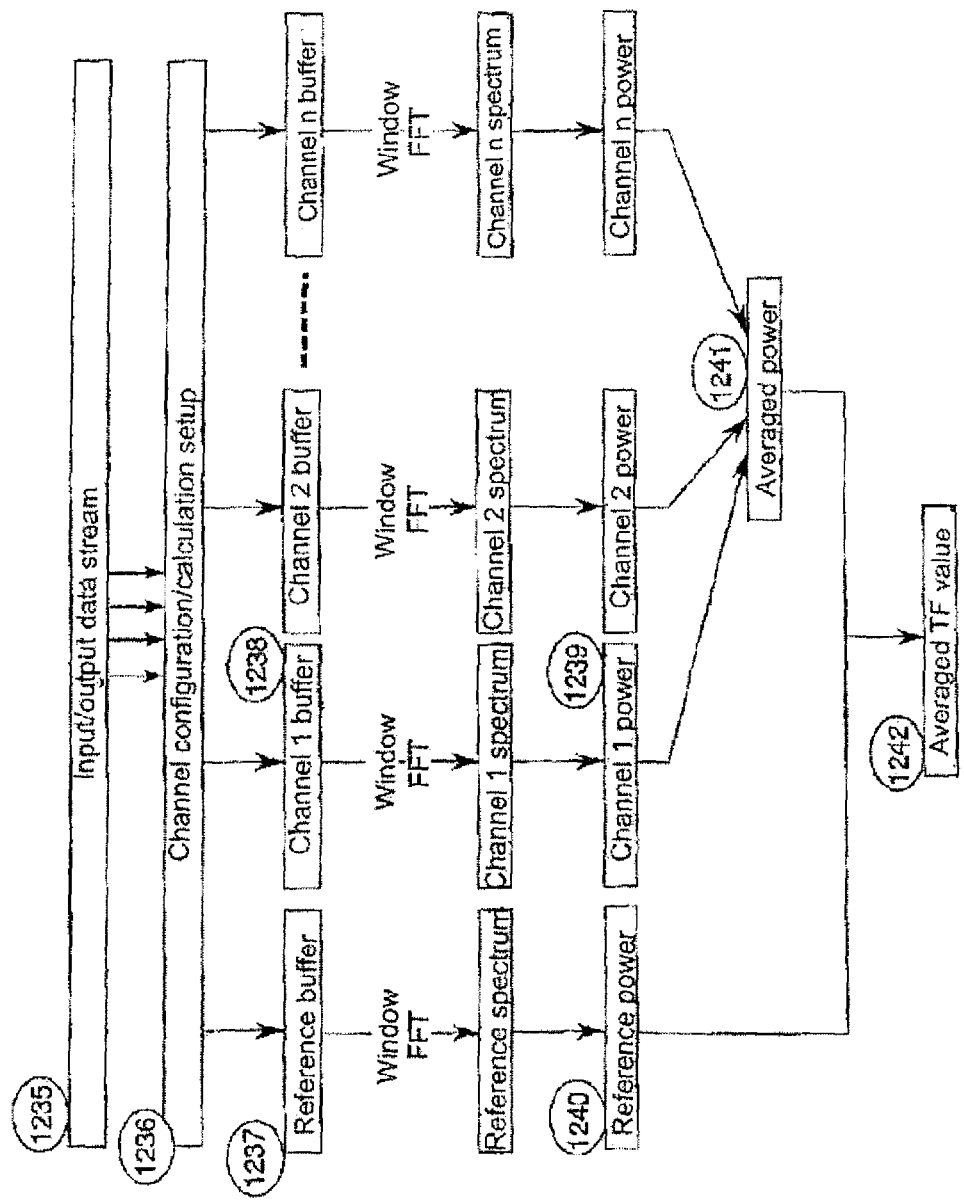
FIG. 12 shows a schematic representation to elucidate the calculation in real time of the room acoustic impulse response in the time domain, taking account of a plurality of input channels of the evaluating device.

FIG. 12 shows a schematic representation to elucidate the calculation of the room acoustic impulse response in the time domain carried out in real time, taking account of a plurality of input channels of the evaluating device (see also FIG. 5). Input data 1235 are allocated to a reference buffer 1237 or multi-channel buffers 1238 in accordance with a channel configuration 1236. Each channel is windowed and Fourier transformed. Then power spectra 1239 are averaged 1241. Dividing by the power spectrum of a reference channel 1240 results in a mean value of the transfer function TF 1242. The transfer function is the Fourier transform of the room acoustic impulse response.

Use of a Detection Time Window

In order to improve the data which can be evaluated, an analysis of portions of an original room acoustic impulse response is provided which, in turn, is derived from the acoustic output signal. For this purpose, a detection time window must be defined in the time domain. The detection time window is set up so that even though direct sound and first reflections are included in the evaluation, later reflections and noise are not. This measure serves, above all, in the determination of a frequency response which corresponds to a subjectively perceived tonal balance and correlates in its time length to components of the room acoustic impulse response that are essential for directional localization. In order to improve the proportion of acoustic output signals of lower frequencies that is measured, these arriving more spread out temporally than the high frequency spectral portions, a detection time window is also used whose time length changes with the frequency, that is, which is significantly longer for low frequencies and shorter for higher frequencies. In general, the window function has half the time length for a frequency which is twice as high. In that, in the method described, the room acoustic impulse response is determined and displayed in real time, exact placement and configuration of the detection time window by the user is directly and easily possible. Preferably, the detection time window is formed in a parameterised functional form 'window (time t, frequency f)', which represents a continuous detection time window in the time-frequency space (see FIG. 13).

For each frequency, a room acoustic impulse response is multiplied by an allocated detection time window. Then the Fourier coefficient is calculated by means of single-point Fourier transformation. Since the window length becomes smaller at higher frequency, the process can also be carried out at high performance levels for greater temporal lengths of the room acoustic impulse response.

The features disclosed in the above description, the claims and the drawings, may be relevant either individually or in any combination to the carrying out the invention in its various embodiments.

The invention claimed is:

1. A method for determining a room acoustic impulse response in the time domain, wherein an acoustic input signal is emitted by an acoustic signal source into an acoustic room under investigation, an acoustic output signal is detected by an acoustic measuring device in the acoustic room under investigation and is fed from the acoustic measuring device to an evaluating device and, by means of the evaluating device, from a reference signal corresponding to the acoustic input signal, and the acoustic output signal, if necessary after prior processing of the acoustic output signal, a room acoustic impulse response in the time domain of the acoustic room under investigation is calculated in real time and prepared for output in that, temporally in parallel and continuously, the acoustic input signal is emitted, the acoustic output signals are detected and, by means of the evaluating device, the room acoustic impulse response in the time domain is determined.

2. The method according to claim 1, wherein the room acoustic impulse response of the acoustic room under investigation including a region of the human hearing frequency range, with a length of several seconds, preferably with a length of at least approximately two to approximately ten seconds, preferably with a length of approximately four seconds to approximately ten seconds is determined.

3. The method according to claim 1, wherein the room acoustic impulse response is determined for a room accommodating a plurality of persons, selected from the following group of rooms: stadium, viewing room, concert hall, theatre, auditorium, lecture theatre, exhibition hall, station building, airport building, church, multi-purpose hall, outdoor site, or factory hall.

4. The method according to claim 1, wherein the determination of the room acoustic impulse response is carried out using multi-thread technology in the evaluating device.

5. The method according to claim 1, wherein by means of automatic, level-controlled triggering, the calculation of the room acoustic impulse response in the evaluating device is interrupted if the acoustic output signal falls below a user-definable trigger level value for the duration of a user-definable trigger time.

6. The method according to claim 1, wherein the calculation and the preparation of the room acoustic impulse response in the time domain of the acoustic room under investigation carried out in real time is performed taking account of a plurality of input channels of the evaluating device, via which respective acoustic output signals which are detected by means of a plurality of allocated acoustic measuring devices in the acoustic room under investigation are fed in.

7. The method according to claim 6, wherein the respective acoustic output signals on a plurality of input channels of the evaluating device are taken into account in that acoustic room impulse responses calculated therefrom are averaged.

8. The method according to claim 1, wherein a portion which disadvantageously influences the determination of the room acoustic impulse response is filtered out of an original room acoustic impulse response that was determined from the acoustic output signals, in that by means of a detection time window, a desired portion of the original room acoustic impulse response is selected in the evaluation device for the calculation of the room acoustic impulse response.

9. The method according to claim 8, wherein the detection time window is variably set with regard to a temporal length.

10. The method according to claim 9, wherein the temporal length of the detection time window is set depending on a frequency of the original room acoustic impulse response.

11. The method according to claim 8, wherein the detection time window is set, with regard to a relative temporal position, for reception of the original room acoustic impulse response.

12. The method according to claim 11, wherein the relative temporal position for receiving the acoustic output signal is set in order to detect portions of the original room acoustic impulse response that arrive temporally at the beginning and to filter out portions of the original room acoustic impulse response which arrive temporally later.

13. The method according to claim 1, wherein the acoustic input signal including at least one acoustic signal type selected from the following group of acoustic signal types is emitted: noise, sweep signal, multitone signal, speech signal, and music signal.

14. The method according to claim 1, wherein the acoustic parameters are derived from the acoustic room impulse response and comprise at least one measurement variable selected from the following group of measurement variables: intensity level, EDT ('Early Decay Time'), reverberation time, and the balance between early and late arriving energy.

15. A computer program product for determining a room acoustic impulse response in the time domain, in real time, with means stored on an electronic storage medium which are configured, on loading into a computer, to carry out a method according to claim 1.

* * * * *